(12) United States Patent
Andreev et al.

(10) Patent No.: US 8,423,613 B2
(45) Date of Patent: *Apr. 16, 2013

(54) SYSTEM FOR MESSAGING AND COLLABORATING IN AN INTRANET ENVIRONMENT

(75) Inventors: Dmitrii Andreev, Port Chester, NY (US); Gregory Vilshansky, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 417 days.

This patent is subject to a terminal disclaimer.

(21) Appl. No.: 12/688,239

(22) Filed: Jan. 15, 2010

(65) Prior Publication Data
US 2010/0122185 A1 May 13, 2010

Related U.S. Application Data

(63) Continuation of application No. 10/777,799, filed on Feb. 12, 2004, now Pat. No. 7,650,380.

(51) Int. Cl.
*G06F 15/16* (2006.01)
(52) U.S. Cl.
USPC .................. 709/204; 709/205; 709/207
(58) Field of Classification Search .................. 709/227, 709/229; 715/758
See application file for complete search history.

(56) References Cited

U.S. PATENT DOCUMENTS

| | | | |
|---|---|---|---|
| 5,414,818 A | 5/1995 | Henson et al. | |
| 5,715,406 A | 2/1998 | Henson et al. | |
| 5,768,515 A * | 6/1998 | Choquier et al. | 709/206 |
| 5,796,393 A | 8/1998 | MacNaughton et al. | |
| 5,862,330 A | 1/1999 | Anupam et al. | |
| 5,964,836 A | 10/1999 | Rowe et al. | |
| 6,101,570 A | 8/2000 | Neumyer | |
| 6,122,723 A | 9/2000 | Day et al. | |
| 6,144,991 A | 11/2000 | England | |
| 6,157,963 A | 12/2000 | Courtright, II et al. | |
| 6,212,548 B1 | 4/2001 | DeSimone et al. | |
| 6,301,609 B1 | 10/2001 | Aravamudan et al. | |
| 6,336,135 B1 * | 1/2002 | Niblett et al. | 709/215 |
| 6,338,086 B1 * | 1/2002 | Curtis et al. | 709/218 |
| 6,442,590 B1 | 8/2002 | Inala et al. | |
| 6,499,053 B1 | 12/2002 | Marquette et al. | |
| 6,519,629 B2 | 2/2003 | Harvey et al. | |
| 6,606,644 B1 | 8/2003 | Ford et al. | |

(Continued)

OTHER PUBLICATIONS

Aoki, Yoshinori; "Collaborative Environment for Supporting Web Users"; Feb. 2001 ; IEEE; pp. 2309-2316.*

(Continued)

*Primary Examiner* — Krista Zele
*Assistant Examiner* — Tariq Najee-Ullah
(74) *Attorney, Agent, or Firm* — Schmeiser, Olsen & Watts; William Schiesser

(57) ABSTRACT

A messaging system and associated computer program product. The messaging system includes a plurality of browsers connected through a common server. The server includes a message engine for receiving from a first user browser a request to enter chat mode with a second user browser; then receiving asynchronously from the second user browser a request to download any content from the common server or any other intranet or Internet server; and responding to the request from the second user browser with content modified to instantiate a chat session between the first and second user browsers.

4 Claims, 5 Drawing Sheets

U.S. PATENT DOCUMENTS

| | | |
|---|---|---|
| 6,785,708 B1 | 8/2004 | Busey et al. |
| 6,857,006 B1 | 2/2005 | Nishizawa |
| 7,000,019 B2 | 2/2006 | Low et al. |
| 7,080,120 B2* | 7/2006 | Betros et al. .................. 709/205 |
| 7,171,473 B1 | 1/2007 | Eftis et al. |
| 7,243,124 B1* | 7/2007 | Gardner et al. ............... 709/205 |
| 7,263,526 B1* | 8/2007 | Busey et al. ........................... 1/1 |
| 7,363,342 B1* | 4/2008 | Wang et al. .................... 709/204 |
| 7,392,306 B1* | 6/2008 | Donner et al. ................. 709/224 |
| 7,401,117 B2* | 7/2008 | Dan et al. ...................... 709/203 |
| 7,668,917 B2* | 2/2010 | Netsch et al. ................. 709/206 |
| 7,725,128 B2* | 5/2010 | Marsh et al. ................. 455/556.1 |
| 2001/0027474 A1 | 10/2001 | Nachman et al. |
| 2002/0055975 A1 | 5/2002 | Petrovykh |
| 2002/0062348 A1* | 5/2002 | Maehiro ....................... 709/205 |
| 2002/0073210 A1 | 6/2002 | Low et al. |
| 2002/0086706 A1 | 7/2002 | Chen et al. |
| 2002/0095336 A1 | 7/2002 | Trifon et al. |
| 2002/0099847 A1* | 7/2002 | Betros et al. .................. 709/238 |
| 2002/0103943 A1 | 8/2002 | Lo et al. |
| 2002/0111942 A1 | 8/2002 | Campbell et al. |
| 2003/0014485 A1 | 1/2003 | Banatwala |
| 2003/0140103 A1 | 7/2003 | Szeto et al. |
| 2003/0225833 A1 | 12/2003 | Pilat et al. |
| 2005/0147086 A1 | 7/2005 | Rosenberg et al. |
| 2005/0171999 A1 | 8/2005 | Bond et al. |
| 2006/0010201 A1 | 1/2006 | Roskowski et al. |
| 2006/0010205 A1* | 1/2006 | Beartusk et al. ............. 709/205 |
| 2006/0026237 A1 | 2/2006 | Wang et al. |
| 2006/0173959 A1* | 8/2006 | McKelvie et al. ............ 709/204 |
| 2006/0253535 A1* | 11/2006 | Betros et al. .................. 709/205 |
| 2008/0046510 A1* | 2/2008 | Beauchamp et al. ......... 709/204 |

OTHER PUBLICATIONS

Aoki, Yoshinori; "Collaborative Environment for Supporting Web Users"; Feb. 2001; IEEE; pp. 2309-2316.

Notice of Allowance (Mail Date Sep. 3, 2009) for U.S. Appl. No. 10/777,799, filed Feb. 12, 2004.

* cited by examiner

SYSTEM FOR MESSAGING AND COLLABORATING IN AN INTRANET ENVIRONMENT

This application is a continuation application claiming priority to Ser. No. 10/777,799, filed Feb. 12, 2004, now U.S. Pat. No. 7,650,380, issued Jan. 19, 2010.

BACKGROUND OF THE INVENTION

1. Technical Field of the Invention

This invention relates to messaging and collaboration in a corporate Intranet environment using an HTTP proxy server.

2. Background Art

Advances and developments in packet networks, consumer premises equipment, network servers, and client software provide a synergistic environment for the development of new communication modes and complexities. Networks such as private intranets and the Internet have become features of private and public telecommunications infrastructures. E-mail is now a standard form of communication and information exchange, and instant messaging has become prevalent as a private extension to chat groups. Instant messaging services enable online or network connected parties to generate and deliver text messages to one another over the network. Some such services allow users to select other persons as collaborators and assign these collaborators to groups, automatically register a person when on-line, advertise the user's selected collaborators to the user when those collaborators register on-line, advertise the user's presence on-line to others who have selected the user as a collaborator, and participate in instant messaging communications between two on-line users.

One messaging solution utilizes instant messaging services and communication protocols to locate a registered user, query the user for a proposed message disposition or other action, and coordinate services among a plurality of communication devices, modes, and channels. A user proxy is registered to the user with an instant messaging system as a personal communication services platform. The user creates collaboration groups and defines specific attributes to associates within each group. Included within each associate definition is a user-selected priority assignment. If an associate is assigned a low priority by the user, the associate will never discern whether the user is online or offline, instead the associate will always communicate and interact with the user via the user proxy. If, however, the associate is assigned a high priority by the user, the associate will discern the user's online status any time he is registered on line. Associates assigned a highest priority by the user are able to interface with the user directly when the user is online, and interface with the user proxy when the user is offline.

Thus, in today's corporate environment there is a well known and addressed business need for messaging and collaboration software, such as Lotus Sametime, Microsoft Netmeeting, and the like. These solutions share the following characteristics. First, the user is required to explicitly start the client messaging application. Second, the user can explicitly terminate the messaging application instead of switching to 'Do Not Disturb' mode. Third, the client messaging application requires a separate login procedure.

SUMMARY OF THE INVENTION

In accordance with an aspect of the invention, there is provided a method for operating a server for managing message communications in a network system by first receiving from a first user a request to enter chat mode with a second user; second receiving asynchronously from the second user a request to download any content from said server or any other server; and responding to the request from the second user with the content modified to instantiate a chat session between the first and second users.

In accordance with a further aspect of the invention, a messaging system includes first and second user browsers, a common server, and a network interconnecting them. A message engine at the common server receives from the first user browser a request to enter chat mode with the second user browser; then receives asynchronously from the second user browser a request to download any content from the common server or any other server; and then responds to the request with content modified to instantiate a chat session between the first and second user browsers.

In accordance with an aspect of the invention, there is provided a computer program product configured to be operable to manage message communications in a network system by first receiving from a first user a request to enter chat mode with a second user; second receiving asynchronously from the second user a request to download any content from that or any other server; and responding to the request from the second user with the content modified to instantiate a chat session between the first and second users.

In accordance with an additional aspect of the invention, there is provided a program storage device for storing computer executable code for managing message communications in a network system by first receiving from a first user a request to enter chat mode with a second user; second receiving asynchronously from the second user a request to download any content from that or any other server; and responding to the request from the second user with the content modified to instantiate a chat session between the first and second users.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, a multimedia broadcast, unicast and real-time messaging functionality is provided for users of a corporate network which does not use any client software other than an HTTP browser, does not require a separate sign on, and may be configured by the network administrator to prevent users from disabling the messaging functionality delivered via the browser.

Figure 1:
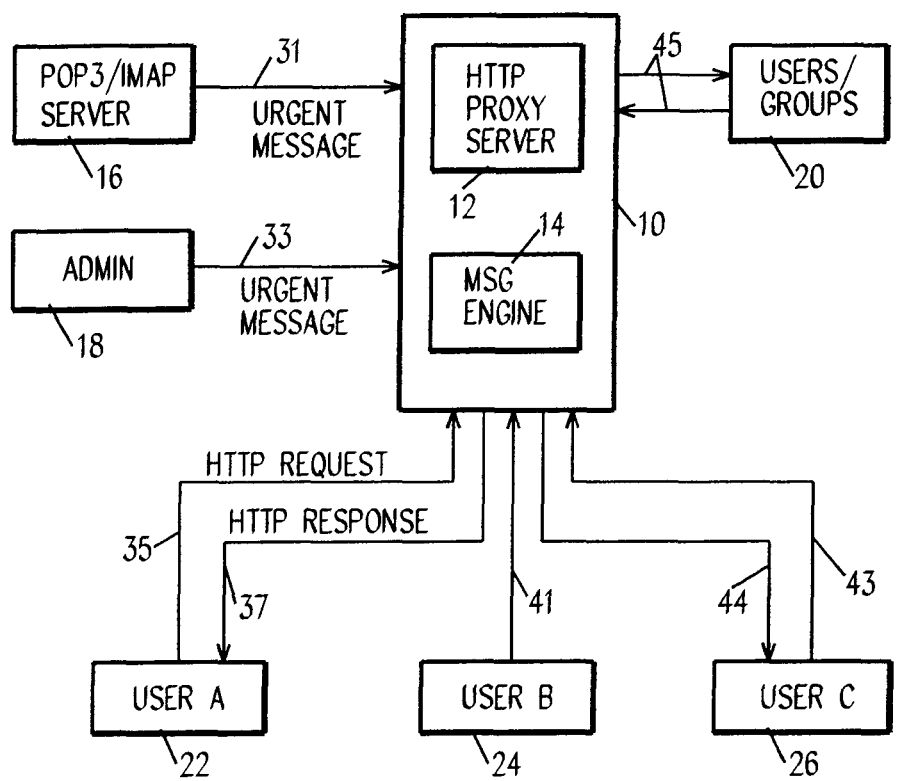
FIG. 1 is system diagram illustrating the architecture of a chat environment.

Referring to FIG. 1, a system diagram illustrates the architecture of the preferred embodiment of the invention. Host 10 includes HTTP proxy server 12 and message engine 14. Communication link 31 connects host 10 to a POP3/IMAP server 16, and link 33 to admin server 18. Links 45 connect host 10 to users/groups storage 20, link 35/37 to user A browser 22, link 41 to user B browser 24, and link 43 to user C browser 26.

Message engine (ME) is put at HTTP proxy server 12 since proxy servers can be and usually are enforced for all browsers 22-26 in a corporate environment. Message engine 14 may be implemented as a software module which looks and acts as an HTTP proxy server from the browsers' point of view.

To enable unicast messaging capabilities, a user 22 must authenticate with the message engine 14. This may be done in a number of ways: (1) the user may be required to authenticate with the HTTP proxy server as part of an organization's network security procedure; or (2) if an SSO engine is implemented, its user authentication mechanism can be used; or (3) the user authentication may be substituted with the client machine authentication, which is a trivial task for static IP addresses; or (4) a dynamic host configuration protocol (DHCP) server assigning IP addresses to client machines can keep track of hardware address of network cards (MAC addresses); or (5) if none of (1)-(4) is implemented, a user can be explicitly asked to authenticate with the ME 14 on the first attempt to use it.

Content which is sent to a user, say 22, is, generally speaking, a user interface to a collaboration tool with the ability to convey text and/or multimedia messages (including audio-video-stream) in one or both directions. Thus, the content can include HTML, Java applets, Javascript, and so forth.

As will be more fully described hereafter, a content page 37 sent to a user A will be returned to browser 22 as a response to a next HTTP request 35 from a browser, whatever the actual HTTP request 35 was. Message 37 can either replace altogether the content of an original response to request 35, or modify it by causing browser 22 to open a separate window with the message text.

To further improve the timely delivery of message 37, proxy server 12 may set a short time to live to all, or most popular, pages served. This is done by setting the time in the header of HTML pages in cache.

In accordance with the present invention, the following functionality may be implemented.

First, message broadcast for all or a group of users in a corporate Intranet. This functionality is primarily intended for the delivery of urgent public announcement messages 31, 33, ranging from weather, fire or civil defense alerts to corporate-level announcements. User groups 20 can be organized according either to the organizational chart (departments, divisions, etc.) or to actual user location (building, floor, etc.) For broadcast functionality, user authentication with the message engine 14 is not required.

Second, message unicast for a particular user. This functionality is primarily intended for delivery of urgent messages 31, 33, such as urgent e-mails, short messages, reminders, etc.

Third, chat mode. When user C wishes to open a chat session with user A, he sends a request 43 to message engine 14 used by both browsers 22, 26. ME 14 signals the HTTP proxy server 12, which then incorporates a chat user interface into the next HTTP response 37 served in response to an HTTP request 35 to user A's browser 22. Chat functionality is implemented in executable client-side code and in the ME 14 server side module.

Figure 2:
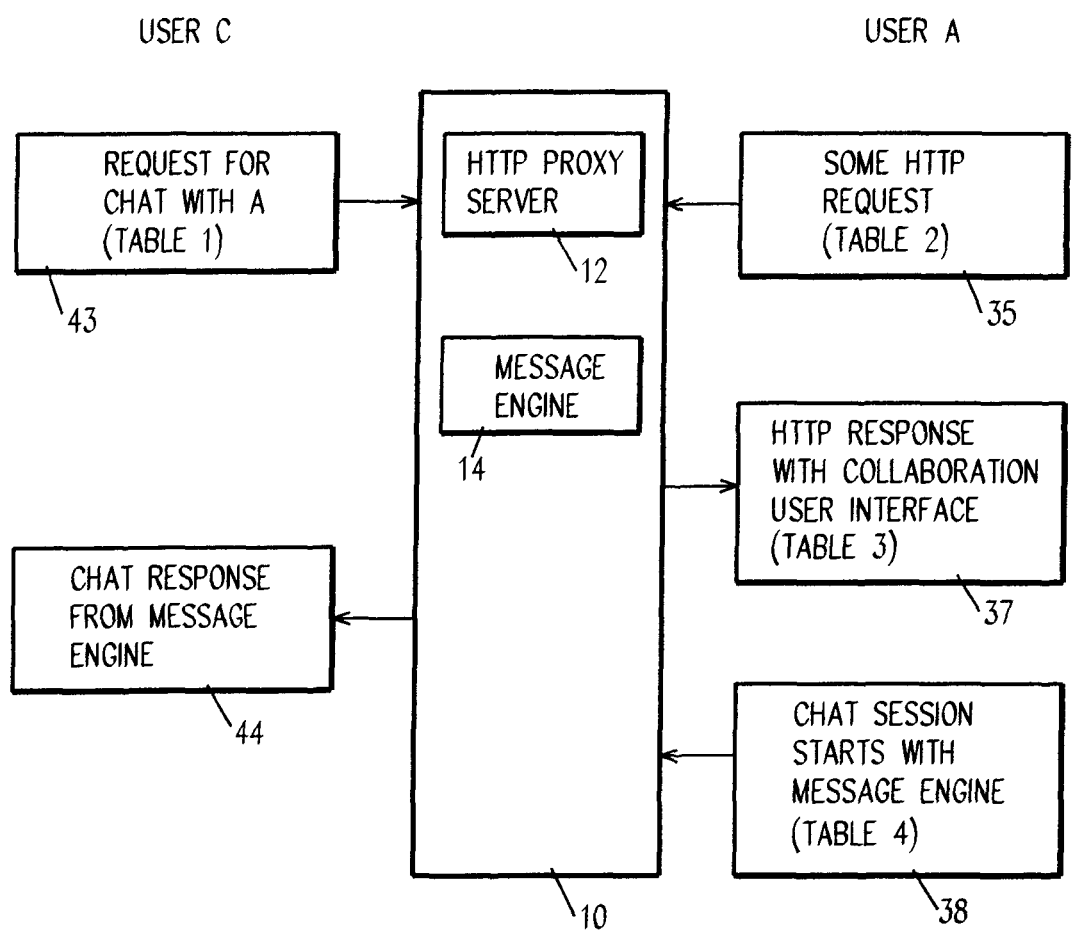
FIG. 2 is a schematic representation of the sequence of HTTP requests and responses during chat initiation in accordance with the preferred embodiment of the invention.

Referring to FIG. 2, a schematic representation of the sequence of HTTP requests and responses during chat initiation is presented.

Figure 3:
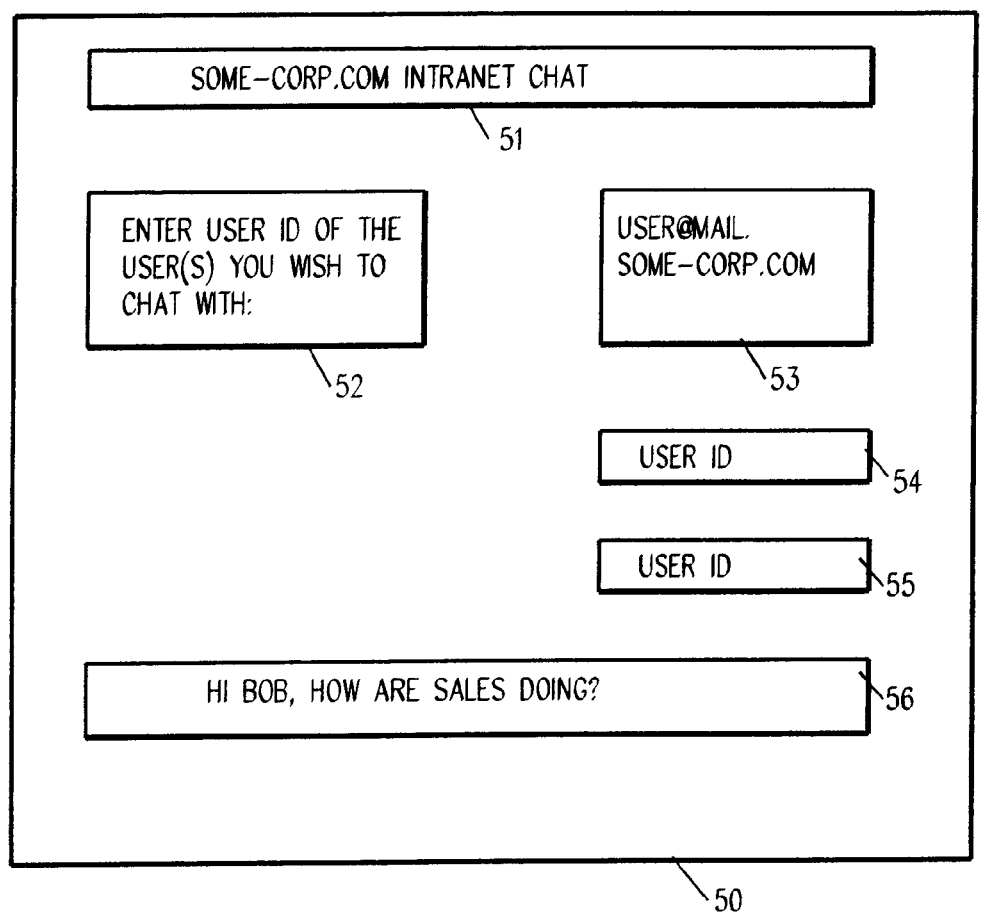
FIG. 3 illustrates schematically a chat invitation form.

Prior to step 43, user C points browser 26 to a known chat URL residing on a local Intranet server 10, and downloads an executable piece of content (a Java applet). Upon downloading and executing the code, browser 26 displays a chat invitation form 50 (FIG. 3), which in this exemplary embodiment includes header field or panel 51, instruction field 52, one or more fields 53-55 for entering the user IDs of users 22, 24 to chat with, and a message field 56. A TCP connection 43, 44 is established with message engine 14. User C enters the userID of, say, user A, enters a message in data field 56, and in step 43 submits the request.

Table 1 illustrates a sample format for chat message 43.

TABLE 1

SAMPLE CHAT MESSAGE FORMAT

CHAT-START userC@mail.some-corp.com
INVITE userID=userA@mail.some-corp.com
CHAT-MSG Hi%2CBob,%2Chow%2Csales%2Care%2Cdoing
CHAT-END Some time after User C submitted chat invitation 43 (form 50) to message engine 14, user A asynchronously submits some HTTP request 35 to download any document or other content from the corporate Intranet or the Internet. At this stage, user A does not know about user C's intention to initiate the chat, but rather is performing some normal activity.

Table 2 illustrates a sample HTTP request 35.

TABLE 2

SAMPLE HTTP REQUEST SUBMITTED BY USER A

Figure 4:
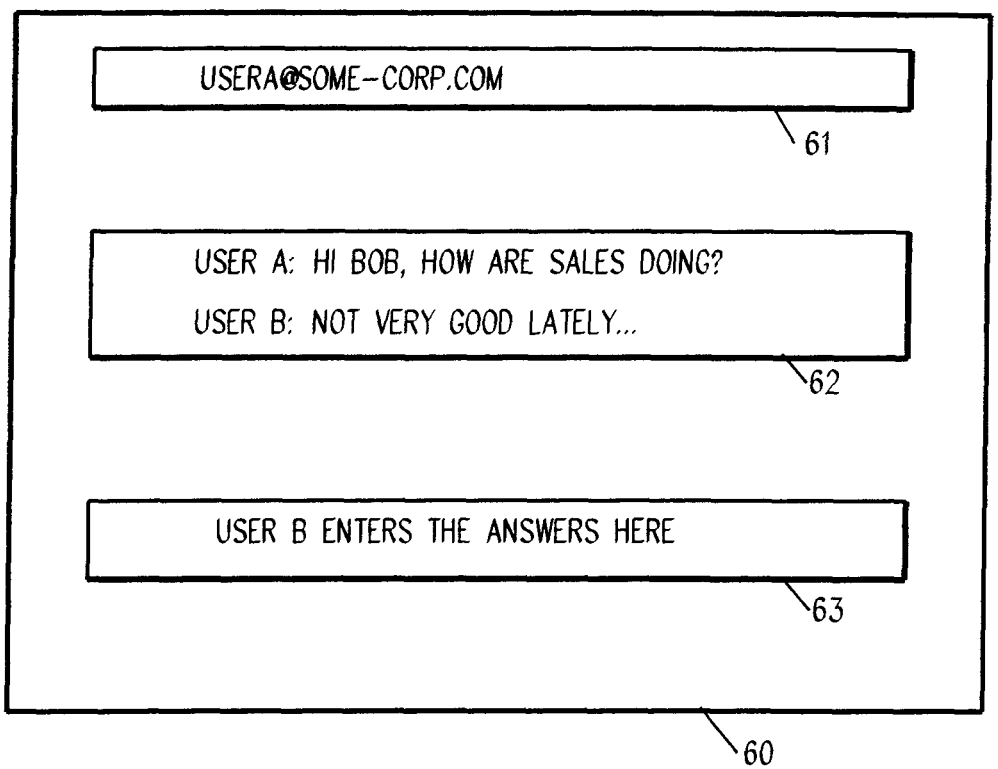
FIG. 4 illustrates schematically a chat user interface.

GET /index.html HTTP/1.1
Accept: text/plain,text/html,*/*;q=0.3
Host: www.cnn.com
User-Agent: Mozilla
Connection: Keep-Alive When HTTP proxy server 12 detects the HTTP request 35 from user A (with which user C desires to chat), it accesses the URL requested by user A and serves it as response message 37 to browser 22, modifying it as illustrated by the bold highlighted material in Table 3, at lines 42-44. The modification is added immediately after the <body> flag, and cause another browser window 60 (FIG. 4) to open at browser 22, including a header field 61, a messages field 62, and a response field 63. The contents of this browser 22 window cause a chat applet instance to download from host 10 and execute at browser 22. This applet establishes a TCP connection with server 12, thus establishing a channel 35, 37, 43, 44 for message exchange between two chat clients 22, 26, with chat server 12 acting as proxy.

TABLE 3

MODIFIED HTTP RESPONSE FROM PROXY SERVER TO USER B

Last-modified: Mon, 28 Jul 2003 18:59:47 GMT
Expires: Mon, 28 Jul 2003 19:00:47 GMT
Cache-control: private, max-age=60
Content-type: text/html
Transfer-Encoding: chunked
<!DOCTYPE HTML PUBLIC "-//W3C//DTD HTML 4.01 Transitional//EN">
<html lang="en">
<head>
    <meta http-equiv="content-type" content="text/html; charset=iso-8859-1">
        <meta http-equiv="refresh" content="1800">
        <title>CNN.com</title>
        <link rel="Start" href="/">

TABLE 3-continued

MODIFIED HTTP RESPONSE FROM PROXY SERVER TO USER B

```
        <link rel="Search" href="/search/">
        <link rel="stylesheet"
href="http://i.cnn.net/cnn/.element/ssi/css/1.0/main.css"
type="text/css">
        <script language="JavaScript1.2"
src="http://i.cnn.net/cnn/.element/ssi/js/1.0/main.js"
type="text/javascript"></script>
        <script language="JavaScript1.1"
src="http://ar.atwola.com/file/adsWrapper.js"></script>
        <style type="text/css">
<!--
.aoltextad text-align: justify; font-size: 12px; color: black;
font-family: Georgia, sans-serif
-->
</style>
        <script language="JavaScript1.1" type="text/javascript"
src="http://ar.atwola.com/file/adsPopup2.js"></script>
        <script language="JavaScript">
document.adoffset = 0;
document.adPopupDomain = 'www.cnn.com';
document.adPopupFile = '/cnn__adspaces/adsPopup2.html';
document.adPopupInterval = 'P24';
document.adPopunderInterval = 'P24';
adSetOther('&TVAR='+escape('class=us.low'));
</script>
</head>
<body class="cnnMainPage">
<script language=javascript>
    window.open('http://proxy-chat.some-corp.com/index.jsp');
</script>
<a name="top_of_page"></a>
<a href="#ContentArea"><img
src="http://i.cnn.net/cnn/images/1.gif" alt="Click here to skip
to main content." width="10" height="1" border="0"
align="right"></a>
<table width="770" border="0" cellpadding="0" cellspacing="0"
style="speak: none">
```

User A's response 44 to user C will be delivered by chat proxy server 12 to user C's chat client over the TCP connection 43, 44 client browser 26 has previously established with chat server 12 based on the CHAT-RESPOND field value of the chat response message example of Table 4, at line 2.

TABLE 4

CHAT RESPONSE MESSAGE EXAMPLE

```
CHAT-START userA@mail.some-corp.com
CHAT-RESPOND userC@mail.come-corp.com
CHAT-MSG Not%2Cvery%2Chow%2Clately...
CHAT-END
```

ALTERNATIVE EMBODIMENTS

Figure 5:
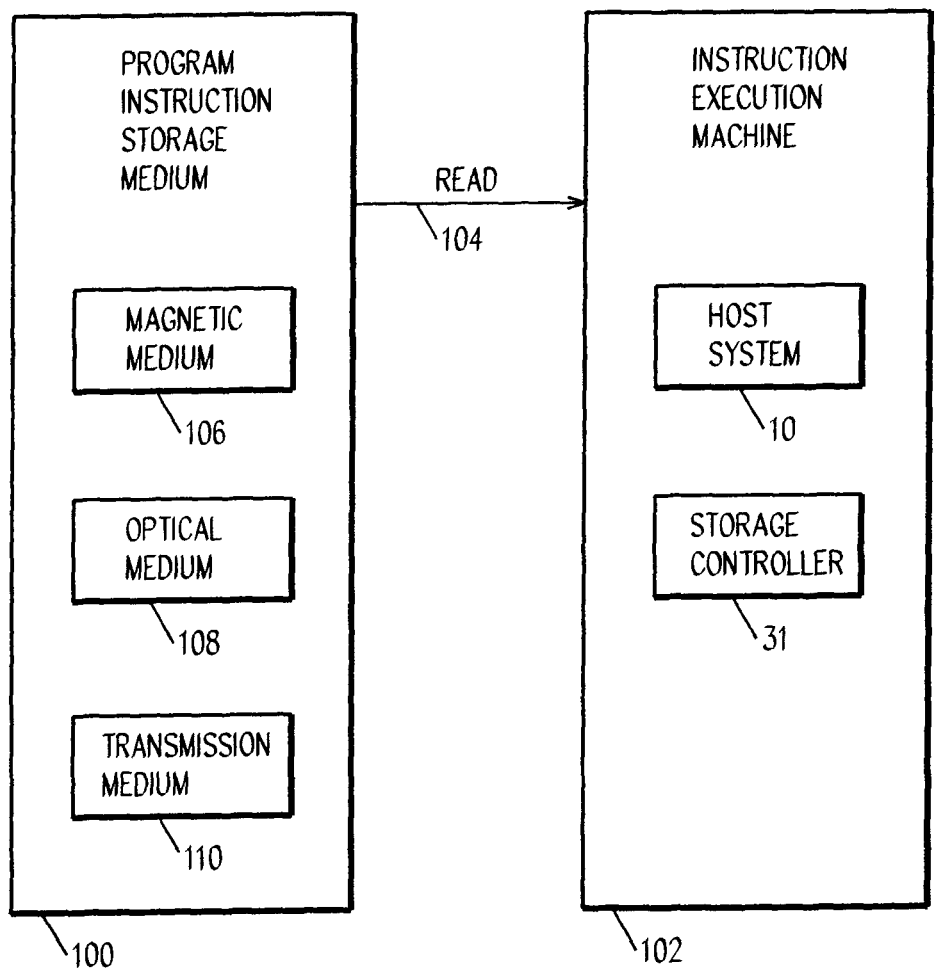
FIG. 5 is a high level system diagram illustrating a program storage device readable by a machine, tangibly embodying a program of instructions executable by a machine to perform method steps for dynamically assigning I/O priority.

It will be appreciated that, although specific embodiments of the invention have been described herein for purposes of illustration, various modifications may be made without departing from the spirit and scope of the invention. FIG. 5 depicts a computer system comprising a computer 102 and a computer program product or program element, or a program storage or memory device 100 such as a computer readable storage medium 110, magnetic or optical wire, tape or disc 106, 108, or the like, for storing computer readable program code (i.e., a program of instructions) readable by a machine as is illustrated by line 104, or controlling the operation of a computer 102, such as a host system 10 or storage controller 31 or processor coupled to the computer readable storage medium 110, according to the method of the invention and/or to structure its components in accordance with the system of the invention (i.e., execution of the program code by the processor causes the processor of the computer to perform the method of the invention).

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A computer system comprising a processor and a computer readable physically tangible storage coupled to the processor, said storage storing program code which upon being executed by the processor performs a method for establishing a chat session between two users in a network system, including a first user desiring to establish a chat session with a second user which does not have a chat application open, said method comprising:

said first user downloading from said server browser executable code for initiating a chat session;

said first user executing said browser executable code to display at a first browser window a chat invitation form including a header field, an instruction field, one or more fields for entering user identifiers, and a message field;

said first user entering to said chat invitation form one or more user identifiers including a user identifier for said second user, and optionally a message to said message field;

receiving at said server from said first user a request to enter chat mode with said second user;

receiving asynchronously at said server from said second user an HTTP request to download content from said server or any other intranet or Intranet server, said second user not currently executing a chat applet instance and being unaware of said request from said first user to enter chat mode;

said server responding to said HTTP request from said second user with an HTTP response including said content modified with a chat user interface to open a second browser window including a header field, a messages field, and a response field, wherein content of said second browser window causes a chat applet instance to download for execution at said second user;

executing said chat applet instance at said second user to instantiate a chat session between said first user and said second user; and establishing a persistent connection between said second browser and said server to establish a channel for message exchange between said first and second browsers with said server acting as proxy.

2. The computer system of claim 1, said method further comprising:

authenticating said first user to a message engine at said server to enable unicast messaging capabilities; and thereafter serving to said first user, in response to an asynchronous message from said first user requesting server content, a user interface to a collaboration tool for conveying text and/or multimedia messages with respect to said first user and an administration server.

3. A computer program product, comprising a computer readable physically tangible storage having a computer readable program code stored therein, said computer readable program code upon being executed by a processor of a computer causes the computer to perform a method for establishing a chat session between two users in a network system, including a first user desiring to establish a chat session with a second user which does not have a chat application open, said method comprising:

said first user downloading from said server browser executable code for initiating a chat session;

said first user executing said browser executable code to display at a first browser window a chat invitation form including a header field, an instruction field, one or more fields for entering user identifiers, and a message field;

said first user entering to said chat invitation form one or more user identifiers including a user identifier for said second user, and optionally a message to said message field;

receiving at said server from said first user a request to enter chat mode with said second user;

receiving asynchronously at said server from said second user an HTTP request to download content from said server or any other intranet or Intranet server, said second user not currently executing a chat applet instance and being unaware of said request from said first user to enter chat mode;

said server responding to said HTTP request from said second user with an HTTP response including said content modified with a chat user interface to open a second browser window including a header field, a messages field, and a response field, wherein content of said second browser window causes a chat applet instance to download for execution at said second user;

executing said chat applet instance at said second user to instantiate a chat session between said first user and said second user; and establishing a persistent connection between said second browser and said server to establish a channel for message exchange between said first and second browsers with said server acting as proxy.

4. The computer program product of claim 3, further comprising:

authenticating said first user to a message engine at said server to enable unicast messaging capabilities; and thereafter serving to said first user, in response to an asynchronous message from said first user requesting server content, a user interface to a collaboration tool for conveying text and/or multimedia messages with respect to said first user and an administration server.

* * * * *